United States Patent [19]

Volkert

[11] Patent Number: 4,972,002

[45] Date of Patent: Nov. 20, 1990

[54] PROCESS FOR PRODUCING CELLULAR PLASTICS BY THE POLYISOCYANATE POLYADDITION METHOD BY MEANS OF STABLE EMULSIONS CONTAINING BLOWING AGENTS, AND SUCH EMULSIONS

[75] Inventor: Otto Volkert, Weisenheim, Fed. Rep. of Germany

[73] Assignee: BASF Aktiengesellschaft, Ludwigshafen, Fed. Rep. of Germany

[21] Appl. No.: 374,829

[22] Filed: Jul. 3, 1989

[30] Foreign Application Priority Data

Jul. 19, 1988 [DE] Fed. Rep. of Germany ....... 3824354

[51] Int. Cl.$^5$ .............................................. C08G 18/14
[52] U.S. Cl. .................................. 521/120; 252/182.2; 252/182.24; 252/182.27
[58] Field of Search ............................... 521/120, 131; 252/182.2, 182.24, 182.27

[56] References Cited

U.S. PATENT DOCUMENTS 4,177,332 12/1979 Mitschk et al. ..................... 521/191

*Primary Examiner*—Maurice J. Welsh
*Attorney, Agent, or Firm*—William G. Conger

[57] ABSTRACT

This invention concerns a process for producing cellular plastics by the polyisocyanate polyaddition process by reaction of (a) organic and/or modified organic polyisocyanates with
(b) at least one high molecular compound with at least two reactive hydrogens and optionally
(c) low molecular chain extenders and/or crosslinking agents in the presence of (d) blowing agents
(e) catalysts
(f) additives and/or processing aids where low boiling fluorinated or perfluorinated hydrocarbons with 3 to 8 carbons that are insoluble or almost insoluble in (a) to (c), sulfur hexafluoride or mixtures thereof are used as blowing agent (d) which is emulsified in reaction components (a), (b), mixtures of (b) and (c) or (a) and (b) as well as stable blowing agent emulsion of the aforementioned blowing agents (d) reaction components (a), (b) or (b) and (c).

24 Claims, No Drawings

PROCESS FOR PRODUCING CELLULAR PLASTICS BY THE POLYISOCYANATE POLYADDITION METHOD BY MEANS OF STABLE EMULSIONS CONTAINING BLOWING AGENTS, AND SUCH EMULSIONS

BACKGROUND OF THE INVENTION

1. Field of the Invention

This invention concerns a process for producing cellular plastics by the polyisocyanate polyaddition process using stable emulsions containing blowing agents, and such emulsions.

2. Description of the Related Art

Production of cellular polyisocyanate polyaddition products such as cellular polyurethane elastomers and flexible, semirigid or rigid polyurethane foams by reaction of organic polyisocyanates and/or modified organic polyisocyanates with higher molecular compounds with at least two reactive hydrogens such as polyoxyalkylene polyamines and/or preferably polyhydroxyl compounds with a molecular weight of 500 to 12,000, for example, plus optional chain extenders and/or crosslinking agents with a molecular weight up to about 500 in the presence of catalysts, blowing agents, processing aids and/or additives is known from numerous patents and publications in the literature. Through a suitable choice of synthesis components, polyisocyanates, high molecular compounds with reactive hydrogens, and optional chain extenders and/or crosslinking agents, elastic or rigid cellular polyisocyanate polyaddition products as well as all the modifications inbetween can be produced by this method.

A survey of methods of producing cellular polyurethane (PU) elastomers, polyurethane (PU) foams and polyisocyanurate (PIR) foams, their mechanical properties and their use can be found, for example, in the monographs *High Polymers*, Volume XVI, "Polyurethanes", Parts I and II by J. H. Saunders and K. C. Frisch (Interscience Publishers, New York 1962 and 1964), *Plastics Handbook*, Volume VII, "Polyurethanes," 1st edition, 1966, published by R. Vieweg and A. Hochtlen and 2nd edition, 1983, published by G. Oertel (Carl Hanser Verlag, Munich) and "Integral Foams," published by H. Piechota and H. Rohr (Carl Hanser Verlag, Munich, Vienna, 1975).

Essentially two types of blowing agents are used to produce cellular plastics by the isocyanate polyaddition process: Low boiling inert liquids that evaporate under the influence of the exothermic polyaddition reaction, e.g., alkanes such as butane, pentane, etc., or preferably halogenated hydrocarbons such as methylene chloride, dichloromonofluoromethane, trichlorofluoromethane, etc., and chemical compounds that form gaseous blowing agents by means of a chemical reaction or a thermal decomposition. Examples include the reaction of water with isocyanates to form amines and carbon dioxide which takes place in synchronization with the production of polyurethane, and the cleavage of thermally unstable compounds such as azobisisobutyronitrile, which yields nitrogen as a cleavage product plus toxic tetramethylsuccinodinitrile, or azodicarbonamide, whose use as a component of a blowing agent combination is described in European Patent No. A 92,740 (CA 1,208,912). Although the latter method, whereby thermally unstable compounds such as azo compounds, hydrazides, semicarbazides, N-nitroso compounds, benzoxazines, etc. (Kunststoffe, Vol. 66, 1976, No. 10, pages 698 to 701) are usually incorporated into a prefabricated polymer or rolled onto the plastic granules and the polymer foamed by extrusion has remained of little importance industrially, the low boiling liquids with a physical action, especially chlorofluoroalkanes, are used throughout the world on a large scale to produce polyurethane foams and polyisocyanurate foams. The only disadvantage to these gaseous blowing agents is the problem of environmental pollution. When gaseous blowing agents are formed by thermal cleavage or chemical reaction, however, cleavage products and/or reactive byproducts are formed and become incorporated into the polyaddition product or are chemically bound and can lead to an unwanted change in the mechanical properties of the plastic. In the case of formation of carbon dioxide from water and diisocyanate, urea groups are formed in the polyaddition product and can lead to an improvement in compressive strength or to embrittlement of the polyurethane depending on the amount.

The mechanism of foaming in the production of polyisocyanate polyaddition products and the influence of surface active additives based on siloxane-oxalkylene copolymers on this reaction was described by B. Kanner et al. (*J. of Cellular Plastics*, January, 1969, pages 32 to 39). According to these and other publications, the essential requirement for forming cellular polyisocyanate polyaddition products with a uniform cell structure and good mechanical properties is a homogeneous solution of the blowing agent such as the carbon dioxide and/or inert low boiling liquids in the organic polyisocyanates and/or compounds with reactive hydrogens ("Blowing Agents for Polyurethanes," by L. M. Zwolinski in *Rubber Age*, July, 1975, pages 50 to 55 and British Patent No. A 904,003). If the blowing agents are not soluble in the aforementioned synthesis compounds, either large pore foams are obtained or in most cases no foams are obtained at all.

To minimize this disadvantage, U.S. Pat. No. 4,544,679 describes the use of specific polyol blends with an increased fluorocarbon solubility. An attempt has been made to obtain homogeneous solutions of the blowing agents and the polyisocyanates and/or polyols by adding sometimes substantial quantities of solubilizers (K. Tanabe, I. Kamemura and S. Kozawa, 28, SPI Conf., 1984, pages 53 to 57). Oligomeric acrylates containing polyoxyalkylene groups and fluoroalkane groups as side groups are also known, such as the oligomers containing several fluoroaliphatic side groups with 5 to 30 wt % fluorine and formulas I and II as defined below. Their synthesis and use as solubilizers in reinforced plastics by being either mixed with the plastic or applied to the fillers or reinforcing fibers is described in German Patent No. B 2,310,857 (U.S. Pat. No. 3,787,351). However, said patent contains no mention of the efficacy of the oligomeric acrylates as emulsifiers in emulsifying low boiling partially or completely fluorinated aliphatic or cycloaliphatic hydrocarbons or sulfur hexafluoride in organic polyisocyanates or higher molecular compounds that are reactive with NCO groups.

Therefore, the goal of the present invention was to replace the fluorocarbons known as blowing agents for the production of cellular plastics by the polyisocyanate polyaddition process either entirely or at least partially by using other environmentally safe blowing agents.

This problem has surprisingly been solved with the help of stable emulsions that contain a blowing agent and consist of low boiling partially or completely fluorinated (cyclo)aliphatic hydrocarbons or sulfur hexafluoride and organic optionally modified polyisocyanates or high molecular compounds that are reactive with NCO groups.

SUMMARY OF THE INVENTION

This invention thus concerns a process for producing cellular plastics by the polyisocyanate polyaddition method by reaction of
(a) organic and/or modified organic polyisocyanates with
(b) at least one high molecular compound with at least two reactive hydrogens and optionally
(c) low molecular chain extenders and/or crosslinking agents
in the presence of
(d) blowing agents
(e) catalysts
(f) processing aids and/or additives,
characterized in that the blowing agent (d) is one or more fluorinated compounds that are insoluble or almost insoluble in (a) to (c) and are selected from the group of fluorinated hydrocarbons, perfluorinated hydrocarbons and sulfur hexafluoride or mixtures thereof and the blowing agent is emulsified in synthesis components (a), (b), (b) and (c), or (a) and (b).

This invention also concerns stable emulsions that contain blowing agents and consist of
(i) at least one low boiling partially or completely fluorinated aliphatic and/or cycloaliphatic hydrocarbon with 3 to 8 carbons that is almost or completely insoluble in (a) or (b) and/or sulfur hexafluoride as blowing agent (d)
(ii) at least one organic and/or modified organic polyisocyanate (a) or at least one high molecular compound with at least two reactive hydrogens (b) or mixtures of (b) and low molecular chain extenders and/or crosslinking agents (c) and
(iii) at least one oligomeric acrylate containing polyoxyalkylene and fluoroalkane side groups as the emulsifier, where the oligomeric acrylate is especially an oligomer containing several fluoroaliphatic side groups with a fluorine content of 5 to 30 wt % based on the total weight and with the formulas

   (I)

or

   (II)

where
$R_f$ is a fluoroaliphatic group with 3 to 20 carbons and 40 to 78 wt% fluorine, where the end group contains at least 3 completely fluorinated carbons,
R is a solubilizing divalent organic group that is free of functional groups containing active hydrogen,
Q is a bonding group by means of which the Rf and R groups are linked together with covalent bonds,
A is a monovalent organic end group,
A' is A or a valence bond under the condition that at least one A' is a valence bond connecting a Q bonded group to another Q,
Q' is a bonding group by means of which A or A' and R are linked together with covalent bonds and
m, n and z are integers of at least 2,
and the use of the stable emulsions containing blowing agents to produce foams containing urethane groups or urethane and isocyanurate groups or cellular elastomers containing urethane groups and/or urea groups by the polyisocyanate polyaddition process.

By emulsifying the low boiling fluorinated hydrocarbons that are insoluble in synthesis components (a), (b), or mixtures of (b) and (c), perfluorinated hydrocarbons, or sulfur hexafluoride in synthesis components (a), (b), or (b) and (c), especially by means of suitable oligomeric acrylates with polyoxyalkylene groups and fluoroalkane groups as side groups as emulsifier, the emulsions that are obtained conform in foaming properties to homogeneous solutions that contain blowing agents. This was surprising because according to commonly held concepts regarding the foam forming mechanism, foams cannot be produced from compounds with at least two reactive hydrogens or blowing agents that are insoluble in polyisocyanates.

Cellular plastics with a uniform fine celled structure are surprisingly obtained due to the good emulsification of the insoluble or almost insoluble blowing agents used according to this invention and their evaporation due to the heat generated by the polyisocyanate polyaddition reaction.

DETAILED DESCRIPTION OF THE INVENTION

The following specifications can be given regarding synthesis components (a) to (f), especially the blowing agents (d) that can be used according to this invention and the oligomeric acrylates with polyoxyalkylene and fluoroalkane side groups that are excellent as emulsifiers to emulsify them and therefore are especially preferred for producing the cellular polyisocyanate polyaddition products, preferably the foams containing urethane groups or urethane and isocyanurate groups:

(a) The organic polyisocyanates may include all essentially known aliphatic, cycloaliphatic, araliphatic and preferably aromatic polyhydric isocyanates.

Specific examples include: alkylene diisocyanates with 4 to 12 carbons in the alkylene group such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate as well as any mixtures of these isomers, 1-isocyanato-3,3,5-trimethyl-5-isocyanatomethylcyclohexane (isophorone diisocyanate), hexahydrotoluene 2,4- and 2,6-diisocyanate as well as the corresponding isomer mixtures, dicyclohexylmethane 4,4'- 2,2'- and 2,4'-diisocyanate as well as the corresponding isomer mixtures and preferably aromatic diisocyanates and polyisocyanates such as toluene 2,4- and 2,6-diisocyanate and the corresponding isomer mixtures, diphenylmethane 4,4'- 2,4'- and 2,2'-diisocyanate and the corresponding isomer mixtures, mixtures of diphenylmethane 4,4'- and 2,4'-diisocyanates, polyphenyl-polymethylene polyisocyanates, mixtures of diphenylmethane 4,4'- 2,4'- and 2,2'-diisocyanates and polyphenylpolymethylene polyisocyanates (crude MDI) as well as mixtures of crude MDI and toluene diisocyanates. The organic di- and polyisocyanates can be used individually or in the form of mixtures.

Frequently, so-called modified polyhydric isocyanates, i.e., products obtained by chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, uretdione groups and/or urethane groups. Specific examples include organic, preferably aromatic polyisocyanates containing urethane groups and having an NCO content of 33.6 to 15 wt %, preferably 31 to 21 wt %, based on the total weight, e.g., with low molecular diols, triols, dialkylene glycols, trialkylene glycols or polyoxyalkylene glycols with a molecular weight of up to 800, modified diphenylmethane 4,4'-diisocyanate or toluene 2,4- and 2,6-diisocyanate, where examples of di- and polyoxyalkylene glycols that may be used individually or as mixtures include diethylene glycol, dipropylene glycol, polyoxyethylene glycol, polyoxypropylene glycol and polyoxypropylene polyoxyethylene glycols. Prepolymers containing NCO groups with an NCO content of 25 to 3.5 wt %, preferably 21 to 14 wt %, based on the total weight and produced from the polyester polyols and/or preferably polyether polyols described below and diphenylmethane 4,4'-diisocyanate, mixtures of diphenylmethane 2,4'- and 4,4'-diisocyanate, toluene 2,4- and/or 2,6-diisocyanates or crude MDI are also suitable. Furthermore, liquid polyisocyanates containing carbodiimide groups and/or isocyanurate rings and having an NCO content of 33.6 to 15 wt %, preferably 31 to 21 wt %, based on the total weight, are also suitable, e.g., based on diphenylmethane 4,4'- 2,4'- and/or 2,2'-diisocyanate and/or toluene 2,4- and/or 2,6-diisocyanate.

The modified polyisocyanates may optionally be mixed together or mixed with unmodified organic polyisocyanates such as diphenylmethane 2,4'- and 4,4'-diisocyanate, crude MDI, toluene 2,4- and/or 2,6-diisocyanate.

The following have proven especially successful as organic polyisocyanates and are preferred for use in the production of cellular elastomers: prepolymers containing NCO groups and having an NCO content of 25 to 9 wt %, especially those based on polyether polyols or polyester polyols and one or more diphenylmethane diisocyanate isomers, preferably diphenylmethane 4,4'-diisocyanate and/or modified organic polyisocyanates containing urethane groups and having an NCO content of 33.6 to 15 wt %, especially those based on diphenylmethane 4,4'-diisocyanate or diphenylmethane diisocyanate isomer mixtures; for production of flexible polyurethane foams: mixtures of toluene 2,4- and 2,6-diisocyanates, mixtures of toluene diisocyanates and crude MDI or especially mixtures of the aforementioned prepolymers based on diphenylmethane diisocyanate isomers and crude MDI; and for the production of polyurethane rigid foams or polyurethane-polyisocyanurate rigid foams: crude MDI.

(b) Preferred high molecular compounds (b) having at least two reactive hydrogens include those with a functionality of 2 to 8, preferably 2 to 6, and a molecular weight of 400 to 8000, preferably 1200 to 6000. For example, polyether polyamines and/or preferably polyols selected from the group of polyether polyols, polyester polyols, polythioether polyols, polyester amides, polyacetals containing hydroxyl groups and aliphatic polycarbonates containing hydroxyl groups or mixtures of at least two of the aforementioned polyols have proven suitable. Polyester polyols and/or polyether polyols are preferred.

Suitable polyester polyols can be produced, for example, from organic dicarboxylic acids with 2 to 12 carbons, preferably aliphatic dicarboxylic acids with 4 to 6 carbons, and polyhydric alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used individually or in mixture. Instead of the free dicarboxylic acids, the corresponding dicarboxylic acid derivatives may also be used such as dicarboxylic acid esters of alcohols with 1 to 4 carbons or dicarboxylic acid anhydrides. Dicarboxylic acid mixtures of succinic acid, glutaric acid and adipic acid in quantity ratios of 20-35:35-50:20-32 parts by weight are preferred, especially adipic acid. Examples of dihydric and polyhydric alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Ethanediol, diethylene glycol, 1,4-butanediol, 1,5-pentanediol, 1,6-hexanediol or mixtures of at least two of these diols are preferred, especially mixtures of 1,4-butanediol, 1,5-pentanediol and 1,6-hexanediol. Furthermore, polyester polyols of lactones, e.g., $\epsilon$-caprolactone or hydroxycarboxylic acids, e.g., $\delta$-hydroxycaproic acid, may also be used.

The polyester polyols can be produced by polycondensation of organic polycarboxylic acids, e.g., aromatic or preferably aliphatic polycarboxylic acids and/or derivatives thereof and polyhydric alcohols in the absence of catalysts or preferably in the presence of esterification catalysts, preferably in an atmosphere of inert gases, e.g., nitrogen, carbon monoxide, helium, argon, etc., in the melt at temperatures of 150 to 250 C., preferably 180 to 220 C., optionally under reduced pressure up to the desired acid value, which is preferably less than 10, especially less than 2. In a preferred version, the esterification mixture is subjected to polycondensation at the temperatures mentioned above up to an acid value of 80 to 30, preferably 40 to 30, under normal pressure and then under a pressure of less than 500 mbar, preferably 50 to 150 mbar. Examples of suitable esterification catalysts include iron, cadmium, cobalt, lead, zinc, antimony, magnesium, titanium and tin catalysts in the form of metals, metal oxides or metal salts. However, polycondensation may also be performed in liquid phase in the presence of solvents and/or entraining agents such as benzene, toluene, xylene or chlorobenzene for azeotropic distillation of the water of condensation To produce the polyester polyols, the organic polycarboxylic acids and/or derivatives thereof and polyhydric alcohols are preferably polycondensed in a molar ratio of 1:1-1.8, preferably 1:1.05-1.2.

The resultant polyester polyols preferably have a functionality of 2 to 4, especially 2 to 3, and a molecular weight of 480 to 3000, preferably 1200 to 3000 and especially 1800 to 2500.

However, polyether polyols, which can be obtained by known methods, are especially preferred for use as the polyols. For example, polyether polyols can be produced by anionic polymerization with alkali hydroxides such as sodium hydroxide or potassium hydroxide or alkali alcoholates such as sodium methylate, sodium ethylate or potassium ethylate or potassium isopropylate as catalysts and with the addition of at least one initiator molecule containing 2 to 8, preferably 2 to 6, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene group.

Suitable alkylene oxides include, for example, tetrahydrofuran, 1,3-propylene oxide, 1,2- and 2,3-butylene oxide, styrene oxide and preferably ethylene oxide and 1,2-propylene oxide. The alkylene oxides may be used individually, in alternation one after the other or as a mixture. Examples of suitable initiator molecules include water, organic dicarboxylic acids such as succinic acid, adipic acid, phthalic acid and terephthalic acid, aliphatic and aromatic, optionally N-mono-, N,N- and N,N'-dialkyl substituted diamines with 1 to 4 carbons in the alkyl group such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-toluenediamine and 4,4'-, 2,4'-and 2,2'-diaminodiphenylmethane.

Suitable initiator molecules also include alkanolamines such as ethanolamine, diethanolamine, N-methyl- and N-ethylethanolamine, N-methyl- and N-ethyldiethanolamine and triethanolamine plus ammonia. Polyhydric alcohols, especially dihydric and/or trihydric alcohols are preferred such as ethanediol, 1,2-propanediol and 1,3-propanediol, diethylene glycol, dipropylene glycol, 1,4-butanediol, 1,6-hexanediol, glycerol, trimethylolpropane, pentaerythritol, sorbitol and sucrose.

The polyether polyols, preferably polyoxypropylene polyols and polyoxypropylene-polyoxyethylene-polyols have a functionality of preferably 2 to 6 and especially 2 to 4 and have a molecular weight of 400 to 8000, preferably 1200 to 6000 and especially 1800 to 4000, and suitable polyoxyietramethylene glycols have a molecular weight up to about 3500.

Suitable polyether polyols also include polymer modified polyether polyols, preferably graft polyether polyols, especially those based on styrene and/or acrylonitrile, which are produced by in situ polymerization of acrylonitrile, styrene or preferably mixtures of styrene and acrylonitrile, e.g., in a weight ratio of 90:10 to 10:90, preferably 70:30 to 30:70, preferably in the aforementioned polyether polyols according to the procedures described in German Patent Nos. 1,111,394, 1,222,669 (U.S. Pat. Nos. 3,304,273, 3,383,351, 3,523,093), 1,152,536 (British Patent No. 1,040,452) and 1,152,537 (British Patent No. 987,618), as well as polyether polyol dispersions containing as the disperse phase, usually in the amount of 1 to 50 wt %, preferably 2 to 25 wt %, e.g., polyureas, polyhydrazides, polyurethanes containing tertiary amino groups and/or melamine and described, for example, in European Patent No. B 11,752 (U.S. Pat. No. 4,304,708), U.S. Pat. No. 4,374,209 and German Patent No. A 3,231,497.

Like the polyester polyols, the polyether polyols may be used either individually or in the form of mixtures. Furthermore, they can be mixed with the graft polyether polyols or polyester polyols as well as the polyester amides containing hydroxyl groups, the polyacetals, polycarbonates and/or polyether polyamines.

Examples of hydroxyl group-containing polyacetals that can be used include, for example, the compounds that can be produced from glycols such as diethylene glycol, triethylene glycol, 4,4'-dihydroxyethoxydiphenyldimethylmethane, hexanediol and formaldehyde. Suitable polyacetals can also be produced by polymerization of cyclic acetals.

Suitable hydroxyl group-containing polycarbonates include those of the known type such as those obtained by reaction of diols, e.g., 1,3-propanediol, 1,4-butanediol and/or 1,6-hexanediol, diethylene glycol, triethylene glycol or tetraethylene glycol with diaryl carbonates, e.g., diphenyl carbonate, or phosgene.

The polyester amides include the mainly linear condensates obtained from polyvalent saturated and/or unsaturated carboxylic acids and their anhydrides and polyhydric saturated and/or unsaturated amino alcohols or mixtures of polyhydric alcohols and amino alcohols and/or polyamines.

Suitable polyether polyamines can be produced from the polyether polyols mentioned above by known methods. Examples include cyanoalkylation of polyoxyalkylene polyols and subsequent hydrogenation of the nitrile thus formed (U.S. Pat. No. 3,267,050) or partial or complete amination of polyoxyalkylene polyols with amines or ammonia in the presence of hydrogen and catalysts (German Patent No. 1,215,373).

(c) The foams containing polyisocyanate polyaddition products and preferably also containing urethane groups or urethane groups and isocyanurate groups can be produced with or without the use of chain extenders and/or crosslinking agents. To modify the mechanical properties, e.g., hardness, however, it has proven advantageous to add chain extenders, crosslinking agents or optionally even mixtures thereof. Suitable chain extenders and/or crosslinking agents include diols and/or triols with a molecular weight of less than 400, preferably 60 to 300. Examples include aliphatic, cycloaliphatic and/or araliphatic diols with 2 to 14 carbons, preferably 4 to 10 carbons, such as ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols such as 1,2,4- and 1,3,5-trihydroxycyclohexane, glycerol and trimethylolpropane and low molecular hydroxyl group-containing polyalkylene oxides based on ethylene oxide and/or 1,2-propylene oxide and the aforementioned diols and/or triols as initiator molecules.

In addition to the aforementioned diols and/or triols, or in mixture with them as chain extenders or crosslinking agents to produce the cellular polyurethane-polyurea elastomers according to this invention, it is also possible to use secondary aromatic diamines, primary aromatic diamines, 3,3'-di- and/or 3,3', 5,5'-tetraalkyl-substituted diaminodiphenylmethanes.

Examples of secondary aromatic diamines include N,N'-dialkyl-substituted aromatic diamines, which may optionally be substituted on the aromatic ring by alkyl groups, where there are 1 to 20, preferably 1 to 4 carbons in the N-alkyl group such as N,N'-diethyl-, N,N'-di-sec-pentyl-, N,N'-di-sec-hexyl-, N,N'-di-sec-decyl-, N,N'-dicyclohexyl-p- and -m-phenylenediamine, N,N'-dimethyl-, N,N'-diethyl-, N,N'-diisopropyl-, N,N'-di-sec-butyl-, N,N'-dicyclohexyl-4,4'-diaminodiphenylmethane and N,N'-di-sec-butylbenzidine.

The preferred aromatic diamines are those having at least one alkyl substituent in ortho position to the amino groups and they are liquid at room temperature and are miscible with component (b), especially the polyether polyols. Furthermore, alkyl-substituted meta-phenylenediamines of the following formulas have also proven successful:

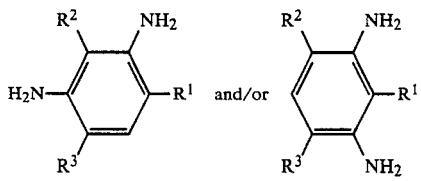

where R3 and R2 may be the same or different and denote a methyl group, a propyl group, and an isopropyl group, and R1 is a linear or branched alkyl group with 1 to 10 carbons, preferably 4 to 6 carbons.

Alkyl groups R1 in which the branching site is on the C1 carbon are especially suitable Examples of R1 groups include methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl and preferably cyclohexyl, 1-methyl-n-propyl, tert-butyl, 1-ethyl-n-propyl, 1-methyl-n-butyl and 1,1-dimethyl-n-propyl.

Examples of alkyl-substituted m-phenylenediamines include especially 2,4-dimethyl-6-cyclohexyl-1,3-phenylenediamine, 2-cyclohexyl-4,6-diethyl-1,3-phenylenediamine, 2-cyclohexyl-2,6-isopropyl-1,3-phenylenediamine, 2,4-dimethyl-6-(1-ethyl-n-propyl)-1,3-phenylenediamine, 2,4-dimethyl-6-(1,1,-dimethyl-n-propyl)-1,3-phenylenediamine and 2-(1-methyl-n-butyl)-4,6-dimethyl-1,3-phenylenediamine. Preferred examples include 1-methyl-3,5-diethyl-2,4-and 2,4-phenylenediamines, 2,4-dimethyl-6-tert-butyl-1,3-phenylenediamine, 2,4-dimethyl-6-isooctyl-1,3-phenylenediamine and 2,4-dimethyl-6-cyclohexyl-m-1,3-phenylenediamine.

Suitable 3,3'-di- and 3,3',5,5'-tetra-n-alkylsubstituted 4,4'-diaminodiphenylmethanes include, for example, 3,3'-dimethyl-, 3,3',5,5'-tetramethyl, 3,3'-diethyl-, 3,3',5,5'-tetraethyl-, 3,3'-di-n-propyl and 3,3',5,5'-tetra-n-propyl-4,4'-diaminodiphenylmethane.

Diaminodiphenylmethanes of the following formula are preferred:

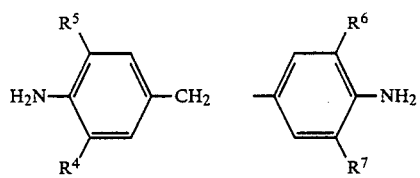

where R4, R5, R6 and R7 may be the same or different and denote a methyl group, an ethyl group, a propyl group, an isopropyl group, a sec-butyl group and a tert-butyl group, but at least one of the groups must be an isopropyl group or a sec-butyl group. The 4,4'-diaminodiphenylmethanes may also be used in mixture with isomers of the formulas

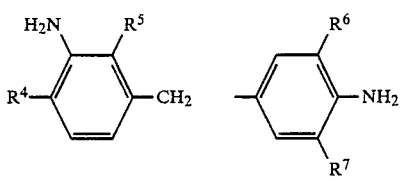

and/or

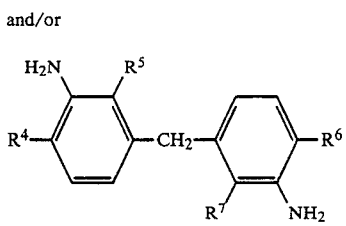

where R4, R5, R6 and R7 have the meanings given above

The preferred diaminodiphenylmethanes are 3,5-dimethyl-3',5'-diisopropyl-4,4'-diaminodiphenylmethane and 3,3',5,5'-tetraisopropyl-4,4'-diaminodiphenylmethane. The diaminodiphenylmethanes may be used individually or in the form of mixtures.

These chain extenders and/or crosslinking agents (c) may be used individually or as mixtures of the same or different types of compounds.

If chain extenders, crosslinking agents or mixtures thereof are used, they are preferably used in amounts of 2 to 60 wt %, preferably 8 to 50 wt % and especially 10 to 40 wt %, based on the weight of components (b) and (c).

(d) Blowing agents (d) that can be used according to this invention include low boiling fluorinated compounds that have little or no solubility in (a), (b), (c) or mixtures of (b) and (c) selected from the group of fluorinated or perfluorinated hydrocarbons as well as sulfur hexafluoride. Partially or completely fluorinated aliphatic or cycloaliphatic hydrocarbons that are gaseous or liquid at room temperature and have 3 to 8 carbons, preferably 3 to 6 carbons, are preferred, whereby the gaseous fluoroalkanes are liquefied at an elevated pressure, e.g., at a pressure of up to 500 bar, preferably from 1 to 250 bar and especially from 2 to 10 bar, and then are emulsified in liquefied form. Examples of aliphatic or cycloaliphatic perfluoroalkanes that are gaseous at room temperature include perfluoropropane, perfluorobutane and perfluorocyclobutane. Suitable aliphatic or cycloaliphatic perfluoroalkanes that are liquid at room temperature include perfluoropentane, perfluorohexane, perfluoroheptane and perfluorooctane or perfluorocyclopentane and perfluorocyclohexane. Examples of partially fluorinated alkanes that can be used include hexafluoropropane and heptafluoropropane. Therefore, heptafluoropropane, perfluorocyclobutane, perfluoropentane and perfluorohexane are especially preferred. The fluorinated or perfluorinated hydrocarbons mentioned as examples and sulfur hexafluoride may be used individually or in the form of mixtures of two or more blowing agents. The fluorinated compounds that can be used as blowing agents according to this invention are emulsified in the synthesis components (a), (b) or mixtures of (b) and (c). To produce such stable emulsions containing blowing agents, the preferred emulsifies are oligomeric acrylates containing polyoxyalkylene and fluoroalkane side groups. Especially preferred emulsifiers are oligomers having several fluoroaliphatic side groups and a fluorine content of 5 to 30 wt % fluorine according to the formulas

  (I)

or

  (II)

where
- $R_f$ is a fluoroaliphatic group with 3 to 20 carbons and 40 to 78 wt % fluorine, where the end group contains at least 3 completely fluorinated carbons,
- R is a solubilizing divalent organic group that is free of functional groups containing active hydrogen,
- Q is a bonding group by means of which the Rf and R groups are linked together with covalent bonds,
- A is a monovalent organic end group,
- A' is A or a valence bond under the condition that at least one A' is a valence bond connecting a Q-bonded group to another Q,
- Q' is a bonding group linking A or A' and R together with a covalent bond and
- m, n and z are integers of at least 2.

Such excellently suitable oligomers containing several fluoroaliphatic side groups with 5 to 30 wt % fluorine are sufficiently known in plastics chemistry, e.g., as adhesion mediators in reinforced plastics, so no further details need be given here. The structure of such oligomers and methods of producing same as well as suitable fluoroaliphatic groups and precursors containing active hydrogen that can be used to produce the oligomers described here are described in detail, for example, in German Patent No. B 2,310,357 and the equivalent U.S. Pat. No. 3,787,351 as well as the literature and patent publications cited there. The disclosures of German Patent No. B 2,310,357 and U.S. Pat. No. 3,787,351 are hereby incorporated by reference.

Therefore, oligomers of formulas I or II, where R is a polyoxyalkylene group, are especially preferred. These especially include a polyoxyalkylene group described by the formula $(OR')_x$, where R' is an alkylene group with 2 to 4 carbons, e.g., a 1,2- or 1,3-propylene group, a 1,2-dimethylethylene group, a 1,4-butylene group and especially an ethylene group, and x is an integer from 5 up to 100 or even more, preferably from 10 to 75, and Rf is a linear or branched aliphatic, cycloaliphatic or aliphatic-cycloaliphatic group with 3 to 20 carbons, preferably 6 to 12 carbons, containing 40 to 78 wt %, preferably 50 to 77 wt %, carbon bonded fluorine, and where at least 3 of the terminal carbons of the linear or branched alkyl group are perfluorinated or preferably the end group has the formula $CF_3CF_2CF_2$. Rf groups which are practically completely-fluorinated are preferred.

The function of the bonding groups Q and Q' consists of linking the fluoro(cyclo)aliphatic groups Rf, the solubilizing groups R and groups A and A' together in the oligomer with covalent bonds. Examples of bonding groups Q and Q' include: polyvalent aliphatic groups such as

—CH$_2$CH$_2$—, —CH$_2$CH< or —CH$_2$CH(CH$_2$—)$_2$ groups, polyvalent aromatic groups such as

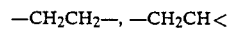

where X is a bridge element from the group

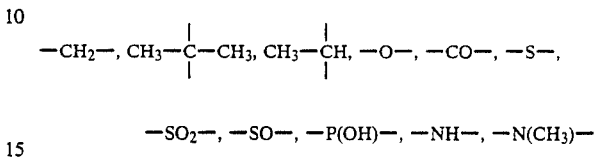

or combinations thereof such as oxalkylene, iminoalkylene, carbonamide, sulfonamide, etc., urethanes such as —CH$_2$CH$_2$OCONH—, ureas such as —NHCONH— and esters such as —CO—O—CH$_2$—.

The fluorine content of the oligomers can vary in a wide range since there is a wide range of possibilities for the structure of the bonding groups Q and Q' and since the fluorine content is determined by the $R_f$ group. Oligomers with a fluorine content of 5 to 30 wt %, preferably 5 to 10 wt %, based on the total weight have proven to be especially suitable as emulsifiers.

The monovalent terminal organic group A is attached with covalent bonds formed by Q' to the solubilizing group R, e.g., to the polyoxyalkylene group. Although the structure of A can vary, this group preferably supplements the solubilizing part in that it maintains or preferably further increases the desired solubility of the oligomer in the high molecular compounds having at least two reactive hydrogens (b) and optionally in the chain extenders and/or crosslinking agents (c) to form the foams. Suitable examples of A groups include acyl groups such as the benzoyl or acetyl group, alkyl groups with 1 to 3 carbons, e.g., the methyl or isopropyl group, hydroxyalkyl groups such as the hydroxyethyl or hydroxypropyl group, alkylmercapto groups such as the mercaptoethyl group, aminoalkyl groups such as the aminoethyl group or optionally substituted aryl groups, e.g., phenyl groups, optionally substituted with halogens such as chlorine atoms, alkyl groups, alkoxy groups, hydroxyl groups or amino groups. In general, Q'A constitutes less than 50 wt % of the group (RQ'A).

The oligomeric acrylates with polyoxyalkylene and fluoroalkane side groups that are suitable emulsifiers are preferably used in an amount of 0.01 to 6 parts by weight, preferably 0.2 to 3.5 parts by weight and especially 0.5 to 2.0 parts by weight, based on 100 parts by weight of synthesis components (a), (b) or a mixture of (b) and (c).

To emulsify the fluorinated hydrocarbons, perfluorinated hydrocarbons, and/or sulfur hexafluoride used as blowing agents (d) according to this invention by means of the acrylate emulsifiers described above, suitable examples include the organic and/or modified organic polyisocyanates (a) and the higher molecular compounds with at least two reactive hydrogens (b). Furthermore, mixtures of (b) and low molecular chain extenders and/or crosslinking agents (c) are also suitable. Blowing agents (d), which are used in an amount of 1 to 150 parts by weight, preferably 1 to 70 parts and especially 5 to 50 parts by weight, per 100 parts by weight of (a) or (b) can be emulsified in (a) or in (b) or in mixtures

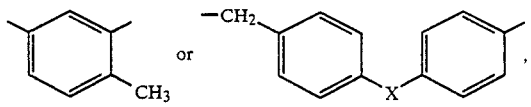

of (b) and (c) to form the stable emulsions. For technical processing reasons, it may prove advantageous to emulsify a portion of blowing agent (d) in (a) and then emulsify the remainder of the blowing agent in (b) or the mixture of (b) and (c), or when using different blowing agents (d), one blowing agent (d) may be emulsified in (a) or (b) and the other blowing agent(s) (d) can be emulsified in the other remaining synthesis components.

When using organic and/or modified organic polyisocyanates (a) as the other emulsion phase, preferably aromatic polyisocyanates are used and are selected from the group consisting of toluene 2,4- and 2,6-diisocyanate or mixtures of said isomers, diphenylmethane 4,4'-, 2,4'- and 2,2'-diisocyanate or mixtures of at least two of these isomers and mixtures of diphenylmethane diisocyanates and polyphenyl polymethylene polyisocyanates. If the organic polyisocyanates are crystalline at room temperature, they are liquefied by mixing with liquid polyisocyanates and/or by suitable partial modification, e.g., carbodiimidization or urethanization.

However, preferably the higher molecular compounds with at least two reactive hydrogens are used as the other emulsion phase. Polyester polyols or mixtures thereof with a functionality of 2 to 3 and a molecular weight of 480 to 3000 and polyether polyols or mixtures thereof with a functionality of 2 to 6 and a molecular weight of 400 to 8000 are especially preferred and are selected from the group of polyoxyethylene polyols, polyoxypropylene polyols, polyoxypropylene-polyoxyethylene polyols and polyoxytetramethylene glycols or mixtures thereof.

The stable emulsions containing blowing agents according to this invention therefore contain or preferably consist of (i) 1 to 150 parts by weight, preferably 1 to 70 parts by weight and especially 5 to 50 parts by weight, per 100 parts by weight of (a) or (b), of at least one low boiling partially or completely fluorinated aliphatic and/or cycloaliphatic hydrocarbon that has 3 to 8 carbons and is almost insoluble or completely insoluble in (a) or (b) and/or sulfur hexafluoride as blowing agent (d).

(ii) at least one organic and/or modified organic polyisocyanate (a) or at least one high molecular compound with at least two reactive hydrogens (b) or mixtures of (b) and low molecular chain extenders and/or crosslinking agents (c) and (iii) 0.01 to 6.0 parts by weight, preferably 0.2 to 3.5 parts by weight, per 100 parts by weight of (a) or (b) of at least one oligomeric acrylate that contains polyoxyalkylene and fluoroalkane side groups, as emulsifier.

To produce the stable emulsions containing a blowing agent, synthesis components (a) or (b) or mixtures of (b) and (c) and blowing agent (d) are mixed thoroughly in the presence of the oligomeric acrylate at temperatures of 0 to 70° C., preferably 20° to 40° C. Suitable mixing apparatus for this purpose include, for example, static mixers such as the SMX from Sulzer (Switzerland) or dynamic mixers such as the "ULTRA-TURRAX", from Hanke and Kunkel (West Germany). If fluorinated hydrocarbons that are gaseous at room temperature are used to produce the emulsions according to this invention, they are liquefied before or during preparation of the emulsion by applying a pressure of up to 500 bar, so the blowing agents perfluoropropane, perfluorobutane and perfluorocyclobutane in particular are present as a liquid phase in the emulsion under a pressure of 500 bar.

In addition to the blowing agents (d) or blowing agent emulsions that can be used according to this invention, water is also suitable as a blowing agent that reacts with the organic, optionally modified polyisocyanates (a) to form carbon dioxide and urea groups and thus influences the compressive strength of the end products. Since the amount of water present in the polyester and polyether polyols as a byproduct is usually sufficient, there is often no need to add water separately. However, if the polyurethane formulation must also have water incorporated into additionally, it is generally used in amounts of 0.05 to 2 wt %, preferably 0.1 to 1 wt %, based on the weight of synthesis component (b).

The best form of fluorinated and/or perfluorinated hydrocarbons and/or sulfur hexafluoride to produce the cellular polyisocyanate polyaddition products depends on the density that is to be achieved and the amount of water optionally to be added. In general, amounts of 1 to 60 parts by weight, preferably 5 to 40 parts by weight and especially 10 to 25 parts by weight, blowing agent (d), based on 100 parts by weight synthesis components (a) to (c) or (a) and (b) yield satisfactory results.

(e) Suitable catalysts (e) for producing the cellular plastics according to the polyisocyanate polyaddition process include especially compounds that greatly accelerate the reaction of the hydroxyl group containing compounds of component (b) and optionally (c) with the organic optionally modified polyisocyanates (a). Examples include organic metal compounds, preferably organic tin compounds such as tin(II) salts of organic carboxylic acids, e.g., tin(II) acetate, tin(II) octoate, tin(II) ethylhexoate and tin(II) laurate, as well as the dialkyltin(IV) salts of organic carboxylic acids, e.g., dibutyltin diacetate, dibutyltin dilaurate, dibutyltin maleate and dioctyltin diacetate. The organic metal compounds are used alone or preferably in combination with strong basic amines. Examples include amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, pentamethyldiethylenetriamine, tetramethyldiaminoethyl ester, bis(dimethylaminopropyl) urea, dimethylpiperazine, 1,2-dimethylimidazole, 1-aza-bicyclo[3.3.0]octane and preferably 1,4-diazabicyclo[2.2.2]octane and alkanolamine compounds such as triethanolamine, triisopropanolamine, N-methyl- and N-ethyldiethanolamine and dimethylethanolamine.

Suitable catalysts also include tris(dialkylamino)-s-hexahydrotriazines, especially tris(N,N-dimethylaminopropyl)-s-hexahydrotriazine, tetraalkylammonium hydroxides such as tetramethylammonium hydroxide, alkali hydroxides such as sodium hydroxide and alkali alcoholates such as sodium methylate and potassium isopropylate as well as alkali salts of long-chain fatty acids with 10 to 20 carbons and optionally OH side groups. 0.001 to 5 wt %, especially 0.05 to 2 wt %, catalyst or catalyst combination based on the weight of component (b) is preferred.

(f) Optionally other additives and/or processing aids (f) may be incorporated into the reaction mixture to produce the cellular plastics by the polyisocyanate polyaddition process. Examples include surface active substances, foam stabilizers, cell regulators, fillers, dyes, pigments, flame retardants, hydrolysis preventing agents, fungistatic and bacteriostatic agents.

Examples of surface active substances include compounds that support the homogenization of the starting materials and are optionally also suitable for regulating the cell structure. Examples include emulsifiers such as the sodium salts of castor oil sulfates or of fatty acids as well as salts of fatty acids with amines, e.g., diethylamine oleate, diethanolamine stearate, diethanolamine ricinoleate, salts of sulfonic acid, e.g., alkali or ammonium salts of dodecylbenzenesulfonic acid or dinaphthylmethanedisulfonic acid and ricinoleic acid; foam stabilizers such as siloxaneoxalkylene copolymers and other organopolysiloxanes, ethoxylated alkylphenols, ethoxylated fatty alcohols, paraffin oils, castor oil and ricinoleic acid esters, Turkey re-d oil and peanut oil as well as cell regulators such as paraffins, fatty alcohols and dimethyl polysiloxanes. Furthermore, the oligomeric acrylates with polyoxyalkylene and fluoroalkane side groups described above are also suitable for improving the emulsifying effect, the cell structure and/or for stabilizing the foam. These surface-active substances are generally used in amounts of 0.01 to 5 parts by weight based on 100 parts by weight of component (b).

Fillers, especially reinforcing fillers, are understood to refer to the known conventional organic and inorganic fillers, reinforcing agents, weighting agents, agents to improve abrasion properties in paints, coating agents, etc. Specific examples include inorganic fillers such as silicate minerals, e.g., lamellar silicates such as antigorite, serpentine, hornblendes, amphiboles, chrysotile, talc; metal oxides such as kaolin, aluminum oxides, titanium oxides and iron oxides, metal salts such as chalk, heavy spar (barite) and inorganic pigments such as cadmium sulfide, zinc sulfide as well as glass, etc. Kaolin (China clay), aluminum silicate and coprecipitates of barium sulfate and aluminum silicate as well as natural and synthetic fibrous minerals such as wollastonite, metal fibers and especially glass fibers of various lengths, optionally sized, are preferred. Examples of organic fillers include coal, melamine, colophony, cyclopentadienyl resins and graft polymers as well as cellulose fibers, nylon, polyacrylonitrile, polyurethane and polyester fibers based on aromatic and/or aliphatic dicarboxylic acid esters and especially carbon fibers.

The organic and inorganic fillers may be used individually or as mixtures and are preferably incorporated into the reaction mixture in amounts of 0.5 to 50 wt %, preferably 1 to 40 wt %, based on the weight of components (a) to (c), but the content when using mats, nonwovens and wovens of natural and synthetic values may reach levels of up to 80 wt %.

Suitable flame retardants include, for example, tricresyl phosphate, tris-2-chloroethyl phosphate, tris-chloropropyl phosphate and tris-2,3-dibromopropyl phosphate.

In addition to the afornentioned halogen substituted phosphates, inorganic flame retardants may also be used such as red phosphorus, aluminum oxide hydrate, antimony trioxide, arsenic oxide, aluminum polyphosphate and calcium sulfate or cyanuric acid derivatives such as melamine or mixtures of at least two flame retardants, e.g., ammonium polyphosphates and a melamine plus optionally cornstarch for making the polyisocyanate polyaddition products flame resistant. In general, it has proven expedient to use 5 to 50 parts by weight, preferably 5 to 25 parts by weight, of the aforementioned flame retardants for each 100 parts by weight of component (b).

Details regarding the aforementioned other conventional additives and processing aids can be obtained from the technical literature, e.g., the monograph by J. H. Saunders and K. C. Frisch "High Polymers," Volume XVI, *Polyurethanes*, Parts 1 and 2, Interscience Publishers, 1962 and 1964 or *Plastics Handbook, Polyurethanes*, Volume VII, Hanser-Verlag, Munich, Vienna, 1st and 2nd editions, 1966 and 1983.

To produce the cellular plastics containing urea and/or preferably urethane groups, the organic polyisocyanates (a), high molecular compounds with at least two reactive hydrogens (b) and optional chain extenders and/or crosslinking agents (c) are reacted in amounts such that the equivalent ratio of NCO groups of polyisocyanates (a) to the total reactive hydrogens of component (b) and optionally (c) amounts to 1:0.85-1.25, preferably 1:0.95-1.15. If the cellular plastics contain at least some bonded isocyanurate groups, then conventionally a ratio of NCO groups of polyisocyanates (a) to the total reactive hydrogens of component (b) and optionally (c) will be from 1.5-60:1, preferably 1.5-8:1.

The cellular plastics of polyisocyanate polyaddition products, preferably cellular elastomers or especially foams, are produced to advantage by the one-shot process, e.g., with the help of the reaction injection molding technique, the high pressure or low pressure technique using open or closed molds, e.g., metal molds. For example, it has proven advantageous to work according to the two-component process and to combine components (b), (d), (e) and optionally (c) and (f) in component (A) and to use the organic polyisocyanates, modified polyisocyanates (a) or blends of the aforementioned polyisocyanates plus optional blowing agents (d) as component (B).

The starting components are mixed at a temperature of 15° to 90° C., preferably 20° to 35° C., and are placed in an open mold or optionally in a closed mold under elevated pressure. The mixing can be performed mechanically by means of a stirrer or by means of a stirring screw or under a high pressure in the so-called counter-current injection method as mentioned above. The mold temperature should be 20° to 60° C., preferably 30° to 60° C. and especially 45° to 50° C.

The cellular elastomers produced by the process according to this invention have a density of about 0.76 to 1.0 g/cm$^3$, preferably 0.9 to 1.0 g/cm$^3$, where the density of the products containing fillers may reach a level of up to 1.4 g/cm$^3$ or more. Moldings of such cellular elastomers are used in the automobile industry, e.g., as head rests, exterior parts such as spoilers and bumpers and for interiors as well as shoe soles.

The soft elastic, semirigid and rigid foams produced by the process according to this invention as well as the corresponding integral foams have a density of 0.02 to 0.75 g/cm$^3$, where the density of the foams is preferably 0.025 to 0.24 g/cm$^3$ and especially 0.03 to 0.1 g/cm$^3$ and the density of the integral foams is preferably 0.08 to 0.75 g/cm$^3$, especially 0.24 to 0.6 g/cm$^3$. The foams and integral foams are used, for example, in the automobile industry, the aircraft industry and the shipbuilding industry, in the furniture and athletic equipment industry and as upholstery materials, housing parts, ski shoes, ski cores, etc. They are especially suitable as insulation materials in the construction and refrigeration industry.

The stable emulsions containing blowing agents according to this invention are used especially to produce foams that contain urethane groups or urethane and isocyanurate groups and to produce cellular elastomers that contain urethane and/or urea groups by the polyisocyanate polyaddition process.

EXAMPLES

EXAMPLE 1

(a) Producing the blowing agent emulsions:
Starting with a mixture of
- 42.5 parts by weight of a polyether polyol with a hydroxyl number of 490 prepared from sorbitol as the initiator molecule and 1,2-propylene oxide,
- 8.1 parts by weight dipropylene glycol and
- 5.8 parts by weight glycerol while stirring thoroughly with an "ULTRA-TURRAX" (from Hanke and Kunkel GmbH + Co. KG, D-7813 Staufen) at 23° C.

2.4 parts by weight of a 50 wt % solution in ethyl acetate of an acrylate oligomer produced by copolymerization of N-ethylperfluorooctanesulfonamidoethyl methacrylate and a methoxypolyoxyethylene acrylate according to Example 2 of U.S. Pat. No. 3,787,351 were added to the starting mixture and then 58 parts by weight perfluoro-n-hexane were added. After a short period of time, a milky viscous emulsion that was stable for more than 2 weeks was obtained.

(b) Producing a polyurethane rigid foam
A component:
Mixture of the emulsion prepared according to Example 1a with the following components incorporated while stirring:
- 1.4 parts by weight diethanolamine,
- 10.4 parts by weight trichloroethyl phosphate,
- 2.4 parts by weight N,N-dimethylcyclohexylamine and
- 2.4 parts by weight polysiloxane foam stabilizer ("TEGOSTAB", 8408 of Goldschmidt AG, Essen)

B component:
115 parts by weight of a mixture of diphenylmethane diisocyanates and polyphenylpolymethylene polyisocyanates with an NCO content of 31 wt % ("LUPRANAT",M 20S of BASF AG).

The A and B components were mixed at 23° C. while stirring vigorously; the foamable reaction mixture was poured into an open mold where it was left to foam.

The product was a very finely divided polyurethane rigid foam with an average pore diameter of about 90 fm and a density of 80 g/l.

COMPARATIVE EXAMPLE

Following the procedure described in Example 1a but in the absence of the emulsifier of acrylate oligomer, perfluoro-n-hexane was added to the mixture of polyether polyol produced from sorbitol and 1,2-propylene oxide, dipropylene glycol and glycerol as described in Example 1a.

The result was not a stable emulsion, but instead a mixture containing the perfluoro-n-hexane in the form of large droplets was obtained.

While stirring at 23° C., first the remaining ingredients of component A described in Example 1a were added to the mixture and then the B component was also incorporated.

When this mixture was used in the polyaddition reaction, almost all the perfluoro-n-hexane escaped from the reaction mixture. No foaming occurred.

EXAMPLE 2

(a) Producing a polyisocyanate blowing agent emulsion
While stirring vigorously with an Ultra-Turrax, first 2.4 parts by weight of the acrylate oligomer solution described in Example 1b and then 58 parts by weight perfluoro-n-hexane were incorporated into 115 parts by weight of a mixture of diphenylmethane diisocyanates and polyphenylmethylene polyisocyanates with an NCO content of 31 wt % ("LUPRANAT" M 20S).

The result was an emulsion that was stable for more than 2 weeks.

(b) Producing a polyurethane rigid foam
A component:
Mixture of
- 42.5 parts by weight of a polyether polyol with a hydroxyl number of 490 produced from sorbitol as the initiator molecule and 1,2-propylene oxide,
- 8.1 parts by weight dipropylene glycol,
- 5.8 parts by weight glycerol,
- 1.4 parts by weight diethanolamine,
- 10.2 parts by weight trichloroethyl phosphate,
- 2.4 parts by weight N,N-dimethylcyclohexylamine and
- 2.4 parts by weight polysiloxane foam stabilizer ("TEGOSTAB",B 8408 from Goldschmidt AG, Essen)

B component
Polyisocyanate blowing agent emulsion according to Example 2a
70 parts by weight of the A component and the total amount of the B component produced according to Example 2a were mixed while stirring well at 23° C.; the foamable reaction mixture was poured into an open mold and left to foam.

The fine-celled foam produced in this way had a density of 89 g/l.

(a) Producing a stable blowing agent emulsion
Following the procedure described in Example 1a, a mixture of
- 42.0 parts by weight of a polyether polyol with a hydroxyl value of 475 produced from sorbitol as the initiator molecule and 1,2-propylene oxide,
- 20.0 parts by weight of a polyether polyol with a hydroxyl value of 400 produced from glycerol as the initiator molecule and 1,2-propylene oxide and
- 8.0 parts by weight of a polyether polyol with a hydroxyl value of 760 produced from ethylenediamine and 1,2-propylene oxide was prepared and then
- 1.7 parts by weight of an acrylate oligomer produced by copolymerization of N-butylperfluorooctanesulfonamidoethyl acrylate and a polyoxyethylene-polyoxypropylene-polyoxyethylene acrylate according to Example 1 of U.S. Pat. No. 3,787,351 were added and then
- 40 parts by weight perfluoro-n-pentane were added.

After a short period of time, a milky viscous emulsion that was stable for more than 2 weeks was obtained.

(b) Producing a polyurethane rigid foam
A component:
Mixture of
- 42.0 parts by weight of a polyether polyol with a hydroxyl value of 475 produced from sorbitol as the initiator molecule and 1,2-propylene oxide, 20.0 parts by weight of a polyether polyol with a hydroxyl value of 400 produced from glycerol as the initiator molecule and 1,2-propylene oxide, 8.0 parts by weight of a polyether polyol with a hydroxyl value of 760 produced from ethylenediamine and 1,2-propylene oxide, 2.3 parts by weight triethanolamine, 2.9 parts by weight trichloroethyl phosphate, 0.9 part by weight of a polysiloxane foam stabilizer (DC 190 from Dow Corning) and 1.2 parts by weight triethylamine.

B component

Mixture of diphenylmethane diisocyanates and polyphenylpolymethylene polyisocyanates with an NCO content of 31 wt % ("LUPRANAT",M 50 of BASF AG)

Following the procedure described in Example 1a, an emulsion was prepared from 38 parts by weight component A, 0.9 part by weight of the acrylate oligomer described in Example 3a and 20.0 parts by weight perfluoro-n-pentane and then the emulsion was mixed with 59 parts by weight component B while stirring intensely at 23° C.

The foamable reaction mixture was poured into an open mold and left to foam there.

The product was a fine-celled polyurethane rigid foam with a density of 105 g/l.

EXAMPLE 4

A component:
Mixture of 70 parts by weight of a polyether glycol with a hydroxyl value of 23 produced from ethylene glycol as the initiator molecule and by polyaddition of 1,2-propylene oxide and then ethylene oxide in a weight ratio of 75:25 (based on the alkylene oxides), 18 parts by weight of a polyether polyol with a hydroxyl value of 35 produced from glycerol as the initiator molecule with polyaddition of 1,2-propylene oxide and then ethylene oxide in a weight ratio of 75:25 (based on the alkylene oxides), 10.5 parts by weight 1,4-butanediol, 1.0 part by weight of a foam stabilizer based on silicone (DC 193 from Dow Corning), 0.5 part by weight triethylenediamine, and 0.02 part by weight dibutyltin dilaurate.

B component:
Quasi-prepolymer containing urethane groups and having an NCO content of 23 wt % produced by reaction of dipropylene glycol with 4,4'-diphenylmethane diisocyanate at 80° C.

(a) Producing a polyurethane soft foam

From 100 parts by weight component A, 1.0 part by weight of an acrylate oligomer produced by a copolymerization of N-ethylperfluorooctanesulfonamidoethyl methacrylate and a methoxypolyoxyethylene acrylate according to Example 2 of U.S. Pat. No. 3,787,351, and 5.0 parts by weight perfluoro-n-hexane A stable blowing agent emulsion was produced according to the procedure described in Example 1a and then mixed with 50 parts by weight component B at 23° C. while stirring vigorously.

The foamable reaction mixture was poured into an open mold and left to foam there.

The product was a fine-celled polyurethane soft foam with a density of 200 g/l.

(b) Producing an integral polyurethane soft foam

The foamable reaction mixture produced in Example 4a was placed in a sheet mold made of aluminum with the inside dimensions 20×20×1 cm tempered to 50° C. in an amount sufficient to form a molded sheet with a total density of 600 g/l when left to foam in the sealed mold.

The result was a foam sheet with a differential reduction in density toward the core of the foam sheet and with a very marked essentially compact surface zone. The molded sheet had a tensile elongation of 350% according to DIN 53,504 and a Shore A surface hardness of 70.

EXAMPLE 5

Producing a polyurethane soft foam

A component:
Mixture of 100 parts by weight of a polyether polyol with a hydroxyl value of 35 produced from glycerol as the initiator molecule and by polyaddition of 1,2-propylene oxide and then ethylene oxide in a weight ratio of 80:20 (based on the alkylene oxides), 3.0 parts by weight water, 0.15 part by weight of a foam stabilizer based on silicone ("TEGOSTAB",4690 from Goldschmidt AG, Essen)

0.25 part by weight potassium acetate and 0.3 part by weight triethylenediamine.

B component:
Mixture of 80 parts by weight of the quasi-prepolymer containing urethane groups according to Example 4 and 20 parts by weight of a mixture of diphenylmethane diisocyanates and polyphenylpolymethylene polyisocyanates ("LUPRANAT",M 20S).

Following the procedure described in Example 1a, a stable blowing agent emulsion was prepared from 104 parts by weight component A, 2.0 parts by weight of the acrylate oligomer described in Example 4a, and 12.0 parts by weight perfluoro-n-hexane and then 60 parts by weight component B were incorporated into this emulsion at 23° C. while stirring vigorously.

The foamable reaction mixture was poured into an open mold and left to foam there.

The result was a very fine-celled flexible polyurethane soft foam with a density of 55 g/l.

EXAMPLE 6

Producing a polyurethane rigid foam based on polyester and containing isocyanurate groups A component:
Mixture of 25 parts by weight of a diethylene glycol polyphthalate with a hydroxyl value of 56, 10 parts by weight of a diethylene glycol polyadipate with a hydroxyl value of 300, 30 parts by weight trichloroethyl phosphate, 1.5 parts by weight of a polysiloxane foam stabilizer ("TEGOSTAB" B 8408 from Goldschmidt AG)

0.5 part by weight pentamethyldiethylenetriamine and 1.0 part by weight potassium acetate.

B component:

Mixture of diphenylmethane diisocyanates and polyphenylpolymethylene polyisocyanates with an NCO content of 31 wt % ("LUPRANAT",M 50 from BASF AG).

Following the procedure described in Example 1a, a stable blowing agent emulsion was prepared from
50 parts by weight component A,
1.0 part by weight of the acrylate oligomer described in Example 4a, and
35.0 parts by weight perfluoro-n-hexane and then
125 parts by weight of component B were added to this emulsion at 23° C. while stirring vigorously.

The foamable reaction mixture was poured into an open mold and left to foam there.

The result was a fine-celled rigid foam with a density of 105 g/l.

The embodiments of the invention in which an exclusive privilege or property is claimed are defined as follows:

1. A process for producing cellular plastics by the polyisocyanate polyaddition process by reaction of
   (a) organic and/or modified organic polyisocyanates with
   (b) at least one high molecular compound with at least two reactive hydrogens and optionally
   (c) low molecular chain extenders and/or crosslinking agents
in the presence of
   (d) blowing agents
   (e) catalysts
   (f) additives and/or processing aids
wherein the blowing agents (d) are low boiling fluorinated compounds that are insoluble or almost insoluble in (a) to (c) and are selected from the group consisting of fluorinated hydrocarbons, perfluorinated hydrocarbons and sulfur hexafluoride or mixtures thereof and these are emulsified in components (a), (b), (b) and (c), or (a) and (b).

2. A process according to claim 1, wherein low boiling fluorinated aliphatic and/or cycloaliphatic hydrocarbons that have 3 to 8 carbons and are insoluble or almost insoluble in (a) to (c) are used as blowing agent (d).

3. A process according to claim 1, wherein at least one perfluoroalkane from the group consisting of perfluoropentane, perfluorohexane, perfluoroheptane and perfluorooctane and/or at least one perfluorocycloalkane from the group of perfluorocyclopentane and perfluorocyclohexane is used as blowing agent (d).

4. A process according to claim 1, wherein at least one aliphatic or cycloaliphatic perfluoroalkane that is gaseous at room temperature is used as blowing agent (d) and is selected from the group consisting of perfluoropropane, perfluorobutane and perfluorocyclobutane and is present as a liquid in reaction components (a), (b), (b) and (c) or (a) and (b) under the foaming conditions.

5. A process according to claim 1, wherein a fluorinated hydrocarbon from the group consisting of hexafluoropropane and heptafluoropropane is used as blowing agent (d).

6. A process according to claim 1, wherein sulfur hexafluoride is used as blowing agent (d).

7. A process according to claim 1, wherein 1 to 60 parts by weight blowing agent (d) based on 100 parts by weight reaction components (a) to (c) or (a) and (b) is used.

8. A process according to claim 1, wherein oligomeric acrylates containing polyoxyalkylene and fluoroalkane side groups are used as emulsifiers to emulsify blowing agent (d) in reaction components (a), (b) or (b) and (c).

9. A process according to claim 1, wherein at least one oligomer containing several fluoroaliphatic side groups and having a fluorine content of 5 to 30 wt %, based on the total weight is used as the emulsifier to emulsify blowing agent (d) in reaction components (a), (b) or (b) and (c) and said oligomer conforms to the formula $$(R_f)_m Q(RQ'A)_n \quad \text{(I)}$$

or $$[(R_f)_m Q(RQ'A')_n]_z \quad \text{(II)}$$

where
Rf is a fluoroaliphatic group with 3 to 20 carbons and 40 to 78 wt % fluorine, where the end group contains at least 3 completely fluorinated carbons,
R is a divalent solubilizing organic group that is free of functional groups containing active hydrogen,
Q is a bonding group which bonds the Rf and R groups to each other with covalent bonds,
A is a monovalent organic end group,
A' is A or a valence bond under the condition that at least one A' is a valence bond connecting a Q bonded group to another Q,
Q' is a bonding group by means of which A or A' and R are bonded to each other with covalent bonds, and
m, n and z are integers of at least 2.

10. A process according to claim 1, wherein the emulsifier for emulsifying blowing agent (d) in reaction components (a), (b) or (b) and (c) is used in an amount of 0.01 to 6.0 parts by weight per 100 parts by weight reaction components (a), (b) or (b) and (c).

11. Stable blowing agent emulsions containing
   (i) at least one low boiling partially or completely fluorinated aliphatic and/or cycloaliphatic hydrocarbon that has 3 to 8 carbons and is insoluble or almost insoluble in organic and/or modified organic polyisocyanates (a) or at least one high molecular compound with at least two reactive hydrogens (b) and/or sulfur hexafluoride as blowing agent (d)
   (ii) at least one organic and/or modified organic polyisocyanate (a) or at least one higher molecular compound with at least two reactive hydrogens (b) or mixtures of (b) and low molecular chain extenders and/or crosslinking agents (c) and
   (iii) at least one oligomeric acrylate containing polyoxyalkylene and fluoroalkane side groups as emulsifier.

12. Stable blowing agent emulsions consisting of
   (i) 1 to 150 parts by weight per 100 parts by weight of organic and/or modified organic polyisocyanates (a) or at least one high molecular compound with at least two reactive hydrogens (b) of at least one low boiling partially or completely fluorinated aliphatic and/or cycloaliphatic hydrocarbon that has 3 to 8 carbons and is insoluble or almost insoluble in (a) or (b) and/or sulfur hexafluoride as blowing agent (d),
   (ii) at least one organic and/or modified organic polyisocyanate (a) or at least one higher molecular compound with at least two reactive hydrogens (b) or a mixture of (b) and low molecular chain extenders and/or crosslinking agents (c), and (iii) 0.01 to 6.0 parts by weight per 100 parts by weight of (a) or (b) of at least one oligomeric acrylate that contains polyoxyalkylene and fluoroalkane side groups as emulsifier.

13. Stable blowing agent emulsions according to claim 12, wherein the fluorinated hydrocarbons are selected from the group consisting of perfluoropentane, perfluorocyclopentane, perfluorohexane, perfluorocyclohexane, perfluoroheptane and perfluorooctane.

14. Stable blowing agent emulsions according to claim 12, wherein the fluorinated hydrocarbons are selected from the group of gases that can be liquefied under a pressure of up to 500 bar and consist of perfluoropropane, perfluorobutane and perfluorocyclobutane.

15. Stable blowing agent emulsions according to claim 12, wherein the fluorinated hydrocarbons are selected from the group consisting of hexafluoropropane and heptafluoropropane.

16. Stable blowing agent emulsions according to claim 11, wherein the organic and/or modified organic polyisocyanates (a) are selected from the group of toluene 2,4-, and 2,6-diisocyanate or mixtures of said isomers, diphenylmethane 4,4'-, 2,4'- and 2,2'-diisocyanate or mixtures of at least two said isomers and mixtures of diphenylmethane diisocyanates and polyphenylpolymethylene polyisocyanates.

17. Stable blowing agent emulsions according to claim 11, wherein at least one polyester polyol with a functionality of 2 to 3 and a molecular weight of 480 to 3000 is used as the higher molecular compound(s) (b).

18. Stable blowing agent emulsions according to claim 11, wherein at least one polyether polyol with a functionality of 2 to 6 and a molecular weight of 400 to 8000 is used as high molecular compound (b).

19. Stable blowing agent emulsions according to claim 11, wherein at least one oligomer containing several fluoroaliphatic side groups and having a fluorine content of 5 to 30 wt % based on the total weight is used as the oligomeric acrylate and is described by the formulas $$(R_f)_m Q (RQ'A)_n \quad (I)$$

or $$[(R_f)_m Q (RQ'A')_n]_z \quad (II)$$

where

Rf is a fluoroaliphatic group with 3 to 20 carbons and 40 to 78 wt % fluorine, where the end group contains at least 3 completely fluorinated carbons, R is a solubilizing divalent organic group that is free of functional groups containing active hydrogen, Q is a bonding group by means of which the Rf and R groups are attached to each other with covalent bonds, A is a monovalent organic end group, A' is A or a valence bond under the condition that at least one A' is a valence bond that connects a Q bonded group to another Q, Q' is a bonding group by means of which A or A' and R are attached to each other with covalent bonds and m, n and z are integers of at least 2.

20. Stable blowing agent emulsions according to claim 19, wherein R has the formula $(OR')_x$, where R' is an alkyl group with 2 to 4 carbons, especially an ethylene group, and x is an integer equal to or greater than 5.

21. Stable blowing agent emulsions according to claim 19, wherein $R_f$ has 3 to 20 carbons and contains 40 to 78 wt % fluorine and at least 3 of the terminal carbons of the Rf alkyl group are perfluorinated.

22. Stable blowing agent emulsions according to claim 19, wherein $R_f$ is a perfluorinated alkyl group with 6 to 12 carbons and has a fluorine content of 50 to 77 wt % and the end group of Rf has the formula $CF_3CF_2CF_2$.

23. Use of the stable blowing agent emulsions according to claim 11 to produce foams that contain urethane groups or urethane and isocyanurate groups by the polyisocyanate polyaddition process.

24. Use of stable blowing agent emulsions according to claim 11 to produce cellular elastomers that contain urethane groups and/or urea groups by the polyisocyanate polyaddition process.

* * * * *